Figure 1:
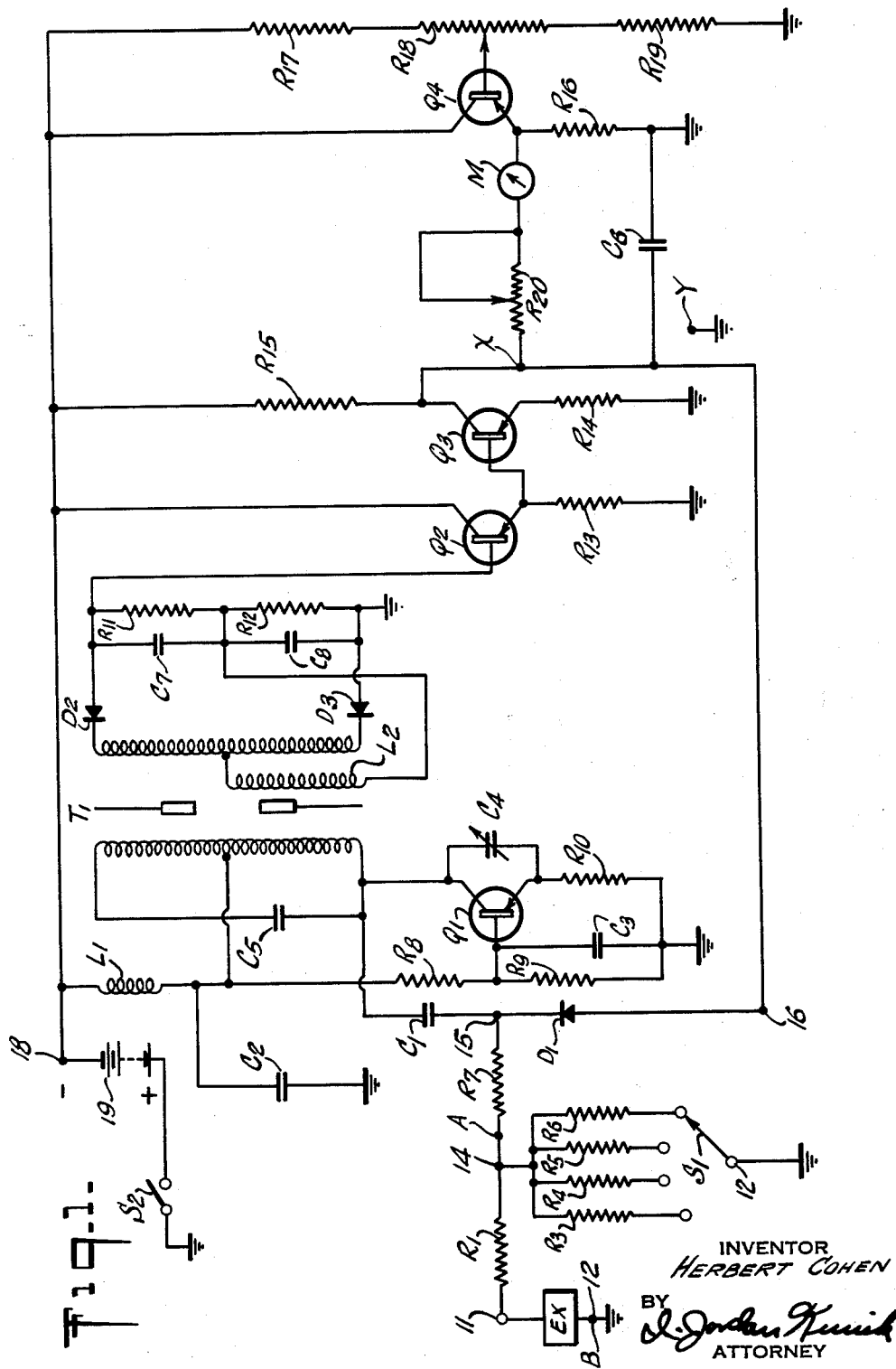

July 5, 1966

H. COHEN 3,259,845

HIGH IMPEDANCE DIRECT CURRENT VOLTMETER
AND AMPLIFIER CIRCUITS

Filed Feb. 9, 1962

2 Sheets-Sheet 1

INVENTOR
HERBERT COHEN
BY
ATTORNEY

United States Patent Office 3,259,845
Patented July 5, 1966

3,259,845
**HIGH IMPEDANCE DIRECT CURRENT VOLT-
METER AND AMPLIFIER CIRCUITS**
Herbert Cohen, 180 West End Ave., New York, N.Y.
Filed Feb. 9, 1962, Ser. No. 172,303
4 Claims. (Cl. 324—123)

This invention relates to novel circuitry which is useful for both direct current amplifiers and direct current voltage measuring devices in which said circuitry presents a very high impedance to the source of voltage to be measured or amplified, while utilizing low impedance transistors throughout.

This desirable combination is achieved in my invention by utilizing as a feedback amplifying device the high impedance characteristics of a variable capacity reverse biased (preferably silicon) diode to act as a voltage responsive transducer for converting voltage changes into frequency changes.

These frequency changes are then used as a signal, relative to a predetermined frequency, in a closed loop transistorized amplifier system whose feedback signal change is made to precisely cancel out and to be equal to the voltage to be measured.

The voltage change of this amplified feedback signal may then be read on an inexpensive low impedance power consuming voltmeter. Only a negligible amount of power is consumed from the source of voltage being measured, by my invention, due to the infinitesimal loading imposed by the variable capacity diode which controls the balancing of the feedback loop.

In the prior art of voltmeters, in order to achieve high impedance, it has been necessary to use thermionic vacuum tubes with their attendant disadvantages of bulk, fragility, power consumption, and limited input impedance.

The present invention overcomes these drawbacks by making possible the full use of transistors, while excelling vacuum tube voltmeters in input impedance.

The necessary elements of my invention consist of the following: a voltage controlled capacitor; means for impressing an external voltage upon said capacitor; circuit means for impressing the difference between a feedback voltage and a predetermined fraction of the voltage to be measured on the foregoing voltage controlled capacitor; a variable frequency oscillator tuned by the voltage controlled capacitor; a discriminator (or ratio detector) for producing from the output of the oscillator a direct voltage which is a function of the departure of the oscillator frequency from a predetermined fixed frequency; a direct current voltage amplifier for generating the foregoing feedback voltage signal from the output of the discriminator; and a direct current voltmeter for measuring the incremental voltage of this feedback signal.

A further but not essential element, is an adjustable bridging network for cancelling out the portion of the feedback voltage necessary to tune the voltage controlled capacitor to the predetermined equilibrium frequency without any input test voltage being present, so that the low impedance meter can be adjusted to zero with the input shorted. The bridge circuit applies the voltage to the other side of the meter which is equal to the feedback voltage necessary to zero the instrument. This effectively gives a zero voltage drop across the meter, so that it will be in condition to read an incremental voltage instead of an absolute voltage.

In some embodiments, when the circuitry is to be utilized as an amplifier, the meter and its associated circuitry may be omitted and an output taken from the feedback circuit for connection to the input of another circuit or instrument.

Each of the foregoing elements and certain partial combinations of them are well known in the electronics art. For instances, automatic frequency control circuits are known in which the output of a discriminator is made to drive a voltage controlled capacitor which in turn tunes a local oscillator, in order to track a radio frequency signal.

However, the present invention achieves its useful and economically valuable objects by its unique employment of the foregoing elements in various combinations to form an automatically self-nulling voltage measuring device or an amplifier having an exceptionally high input impedance.

One object of my invention is to provide an inexpensive and accurate high impedance D.C. voltmeter.

Another object is to provide a fully transistorized voltmeter having high input impedance.

A further object is to provide a self nulling-voltage measuring device based on a closed loop feedback system using a variable frequency as the error signal.

A further object is to provide a portable, self-contained multi-range voltage test instrument which will load the source of voltage to be measured to a negligible degree.

A still further object is to provide a D.C. amplifier having a high input impedance and high gain characteristics.

Still other objects and advantages of the invention will be apparent from the specification.

Figure 2:
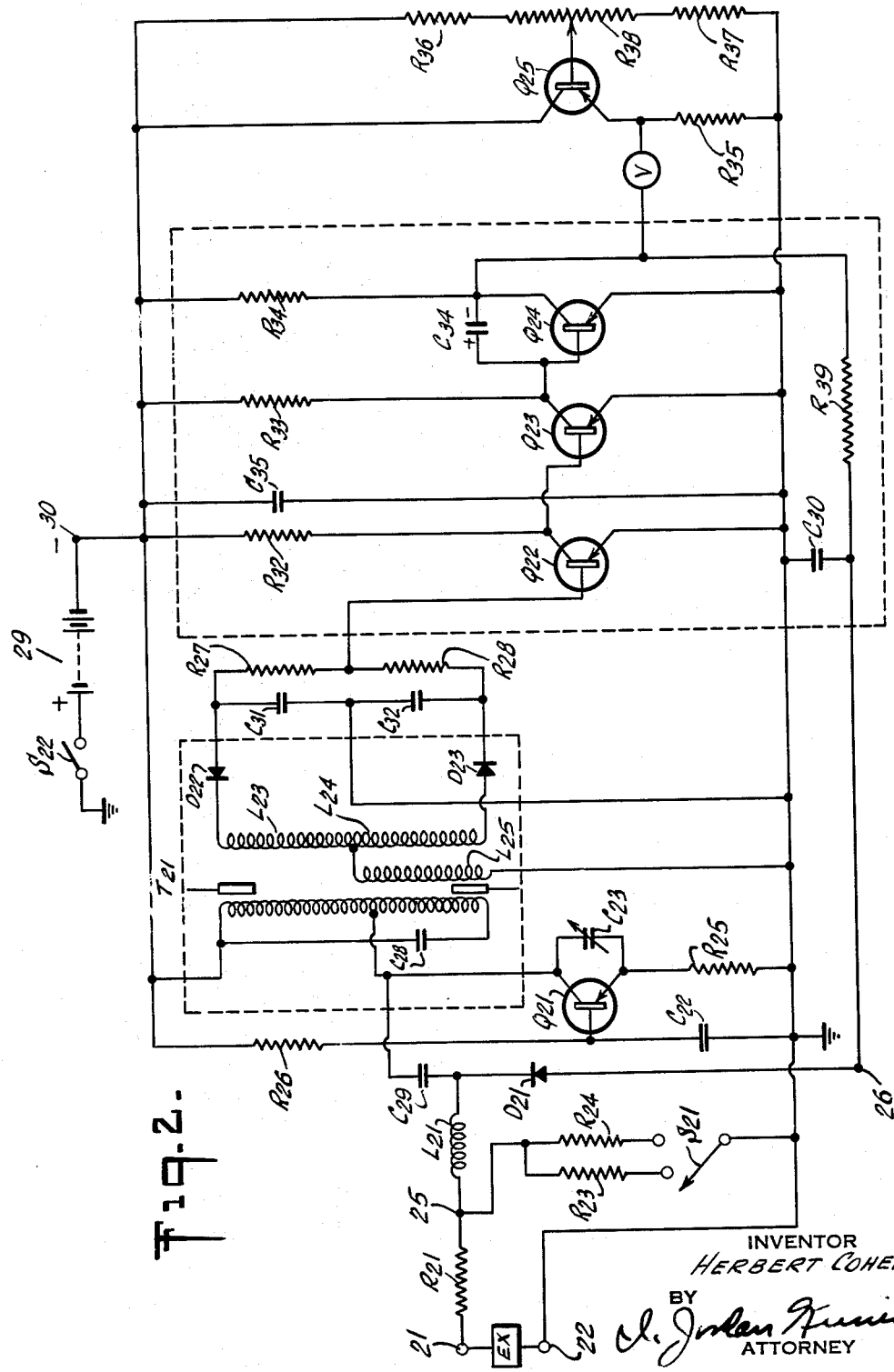

The features of novelty which are believed to be characteristic of the invention are set forth herein and will best be understood, both as to their fundamental principles and as to their particular embodiments, by reference to the specification and accompanying drawings, in which:

FIGURE 1 is the schematic wiring diagram of one embodiment of my invention using a frequency discriminator to develop the feedback signal; and FIG. 2 is the schematic wiring diagram of an alternative formed of my invention using a ratio detector to develop the frequency sensitive feedback signal.

Referring to the system disclosed in FIGURE 1, terminals 11 and 12 are the input test probe connection points between which the external voltage EX to be measured is applied, terminal 12 being the common ground of the system. Range switch S1 selects which of four predetermined fractions of the input voltage EX will be impressed on point 14 of the circuit. These fractions are determined by the choice of the high valued fixed resistor R1, which forms the upper leg of an attenuator, and the value of the lower leg resistor amongst R3, R4, R5, and R6, being chosen by range switch S1. Consequently, the potential of point 14 of the circuit will experience a fraction of EX equal to one of the ratios $$\frac{R3}{R1+R3}, \frac{R4}{R1+R4}, \frac{R5}{R1+R5}, \text{ or } \frac{R6}{R1+R6}$$

This fractional potential is impressed through the protective high valued isolation resistor R7 on the cathode side 15 of the variable capacitance voltage controlled reverse bias diode D1, which is preferably a silicon diode. Such diodes commonly have reverse biased leakage resistances on the order of 1000 megohms. For this reason, the input impedance of this instrument will be determined by the input voltage divider rather than by diode D1.

The amount of reverse biasing direct current potential which modulating diode D1 will experience will depend on the sum of the selected fraction of input potential EX appearing at point 15 of the circuit, and the potential of point 16 on the anode side of diode D1. The latter is determined relative to ground by the instrument supply potential appearing at terminal 18 and the amount of voltage drop produced by the feedback amplifier circuit described hereinbelow.

The foregoing sum of D.C. potentials between points 15 and 16 will also determine the value of capacitance which diode D1 will exhibit.

Connected to the cathode side of diode D1 by way of coupling capacitor C1 is an oscillator whose frequency is modulated by the variable capacitance of said diode. Said oscillator comprises the PNP transistor Q1 whose collector is connected to capacitor C1, while its base circuit includes biasing voltage divider resistors R8 and R9, and RF bypass capacitors C2 and C3, connected, respectively, between said base and common ground. Connected between the emitter of transistor Q1 and ground is a load resistor R10. An RC choke L1 is connected in the circuit of divider resistor R8. Connected between the collector and emitter of transistor Q1 is a feedback and phasing capacitor C4.

The tank circuit of this oscillator is connected to the collector of transistor Q1 and ground 12 through bypass capacitor C2. This tank circuit includes the primary of transformer T1, which is tapped for impedance matching purposes, and provided with parallel fixed capacitance C5, and the variable parallel capacitance offered by the series connection of capacitances C1, diode D1 and capacitance C6, the latter being connected between the anode of diode D1 and ground. Capacitances C1 and C6 are very large with respect to the capacitance of the reverse biased diode D1, and serve only to isolate its D.C. control potentials from the D.C. component of the oscillator transistor potentials.

Transformer T1 is slug tuned to the predetermined nominal frequency of oscillator Q1. It is to be understood that the distributed capacitances of the windings of T1 will enter into the operation of the tank and discriminator circiuts. In one successful model of this instrument, the zero frequency of oscillation was 10.7 megacycles.

The secondary of transformer T1 is connected in a well known Foster-Seeley type of frequency discriminator circuit which has the property of producing at its output across resistors R11 and R12 a D.C. voltage which varies in polarity and magnitude in accordance with the deviations of the input frequency above and below resonance with the predetermined frequency to which T1 is tuned.

The discriminator circuit comprises the secondary of transformer T1 to the center tap of which is connected one end of tertiary winding L2, the other end of which is connected between a pair of load resistors R11 and R12 and a pair of filter capacitors C7 and C8. Connected between the ends of the secondary of transformer T1 and load resistors R11, R12, and capacitors C7, C8, are respective discriminator diodes D2 and D3.

One reason for preferring this circuit is that the transfer function in volts per megacycle deviation is greater in a Foster-Seeley type discriminator than in a ratio detector type of frequency discriminating device.

It is to be noted that the phase of the output of the discriminator of FIG. 1 may be inverted 180° simply by reversing both diodes D2 and D3; consequently, for a given requirement of output phase polarity, any number of phase inverting amplifier stages may be accommodated by proper selection of diode polarity.

The D.C. feedback amplifier of the system of FIG. 1 comprises the emitter follower PNP transistor Q2 which couples the output of the discriminator appearing at the top of resistor R11, to the base of the amplifier PNP transistor Q3. Load resistors R13 and R14 are connected between the emitters of respective transistors Q2 and Q3 and ground.

Load resistor R15 is connected between the collector of transistor Q3 and terminal 18. The amplified D.C. signal appearing across the output load resistor R15 for transistor Q3 is impressed via a feedback lead to the anode of the variable capacity diode D1, thereby completing the negative feedback loop.

Without any impressed input voltage on terminals 11 and 12, there will be a particular reverse biasing potential across diode D1 which will result in a capacitance for D1 corresponding to an equilibruim frequency for oscillator Q1 which is near resonance with the predetermined discriminator frequency set by the slug tuning and distributed capacitance of transformer T1. This is a fast stable feedback loop in which the reciprocal of the loop gain is a measure of the accuracy with which it will hold equilibrium between the reverse negative feedback potential at the anode of D1 and the fixed discriminating frequency of T1. Thus, for a gain of 100, an accuracy of 1% can be expected.

Since the foregoing equilibrium condition corresponds to a zero value of impressed voltage between terminals 11 and 12, it is desirable to provide a bridging reference potential which will cancel out this starting equilibrium potential in the output indicating voltmeter M connected between the collector of transistor Q3 and ground.

Such a bridging circuit is provided, and includes an emitter follower PNP transistor having a load resistor R16 connected between its emitter and ground while its collector is connected to terminal 18. The base of transistor Q4 is connected to voltage divider network consisting of resistors R17, R18, and R19, of which R18 is an adjustable potentiometer for setting the base potential of emitter follower Q4 so as to zero meter M. Resistors R17, R18, and R19, are connected in series between terminal 18 and ground.

The collectors of transistors Q2 and Q4 are connected to the common terminal 18.

The output voltmeter M, which may have a relatively low impedance, is provided with a calibrating series rheostat R20.

After balancing out the basic feedback voltage as above described, meter M will read zero in the absence of input voltage across terminals 11 and 12. If now, an input voltage is applied between terminals 11 and 12, it will displace the potential of the cathode of voltage controlled capacitance diode D1 away from ground by a selected fraction of the magnitude of this input voltage. This displacement will now de-tune oscillator Q1 from the equilibrium frequency, and, consequently, will immediately generate a new D.C. signal in the discriminator output resistors R11 and R12. This signal will be amplified in Q3 and will thereby increase the output signal impressed upon the anode of diode D1, until a change has been produced in the voltage of said anode exactly equal to the fraction of EX applied at the cathode of said diode. At this time, the oscillator frequency will have been corrected back to the fixed equilibrium frequency dictated by diode D1.

In this way, the feedback amplifier impresses a voltage on diode D1 in the zero position of the meter which is used as a bias reference. When an input voltage is applied to the instrument at point EX (11), it is properly attenuated, as necessary, and applied to diode D1 between point 15 and ground, whereby said diode is re-biased in response to the input signal. The resultant change in feedback voltage re-adjusts the bias at point 16 to compensate for the signal input applied to diode D1 at point 15. In some embodiments, a net change in bias across D1 of less than 1% has been achieved. The input signal has now created an incremental voltage or voltage change from the zero point at point 16 which is directly proportional to the signal voltage at point 15. Resistors R3, R4, R5, and R6, are resistors for attenuating in decades the input voltage at EX.

The operation of the instrument of FIG. 1 is as follows: Battery switch S2 is closed to energize the system. Range switch S1 is set to the desired voltage division. Oscillator Q1 will now deliver an RF signal to the discriminator diodes D2 and D3. These diodes will then deliver a signal to the amplifier transistors Q2 and Q3, which will be proportional to the deviation of the oscillator Q1 frequency from the pre-tuned frequency of transformer T1. The output signal from amplifier Q3 is impressed via point 16 upon the voltage controlled capacitor diode D1, which then alters the frequency of oscillator Q1, until it is near resonance with T1. When the transfer functions of the variable frequency oscillator Q1 and frequency discriminator circuit are in equilibrium, the system will have arrived at a stable, negative feedback control voltage on point 16. The setting of bridging potentiometer R18 is then adjusted until meter M reads zero.

The D.C. voltage source to be measured is now connected between terminals 11 and 12. The fraction of the input potential EX selected by range switch S1 is now added to the total voltage across diode D1. The total voltage across diode D1 is now the sum of the fraction of the input voltage as selected by S1 and the voltage at point 16.

The measuring system is now unbalanced by the consequent change in the capacity of diode D1 and in frequency change of oscillator Q1. The resultant change of discriminator signal across resistors R11 and R12 will be amplified in Q3 and result in a re-adjustment in the potential on point 16 to compensate exactly for the increment of EX which displaced the frequency of oscillator Q1 from its equilibrium frequency.

This voltage re-balancing will consequently cause meter M to read the exact voltage change necessary to re-balance. This change is equal to the input potential EX to be measured, attenuated by the selected range factor.

The alternative circuit shown in FIG. 2 is very similar to that of FIG. 1, except that a ratio detector circuit instead of a discriminator circuit is used to generate a signal proportionately responsive to deviations from a predetermined frequency. Also, three cascade stages of D.C. amplification are used to increase the loop gain.

Referring now to FIG. 2, the external voltage source EX under test is connected by terminals 21 and 22 to the voltage divider comprising resistor R21 and one of the two resistors R23 or R24 selected by the range switch S21. Point 25 in the circuit is isolated from the cathode of the variable capacitance reversed biased silicon diode D21 by radio frequency choke L21. PNP transistor Q21 is connected in a variable frequency oscillator circuit including load resistor R25, bias resistor R26, bypass capacitor C22, feedback capacitor C23, and a tank circuit including fixed capacitance C28 and the tapped primary of transformer T21. The variable capacitance of diode D21 is coupled for RF to the foregoing tank circuit by the large bypass capacitors C29 and C30, so as to tune the frequency of oscillator Q21 in response to the DC potentials appearing between points 25 and 26 of the circuit.

The ratio detector includes the two secondary windings L23 and L24 of transformer T21 which are slug tuned to the center frequency. The ratio detector diodes D22 and D23 deliver a D.C. difference signal to the center tap of bridging resistors R27 and R28. Capacitors C31 and C32 filter the opposing pulsating D.C. diode signals which appear across resistors R27 and R28.

The D.C. cascade amplifier includes PNP transistors Q22, Q23, and Q24, together with their respective load resistors R32, R33, and R34. Capacitor C34 is supplied to suppress the tendency of this high gain D.C. amplifier to oscillate. Condenser C35 is connected between the high side of the power supply to ground, and performs as a bypass capacitor to ensure decoupling of the RF circuit from the amplifier circuit, and to short out undesirable feedback paths.

The adjustable bridging circuit here comprises PNP transistor Q25, load resistor R35, divider resistors R36 and R37, and the adjustable potentiometer R38. The relatively low impedance output voltmeter V is connected between the collector of transistor Q24 and the emitter of transistor Q25 so as to indicate changes in the potential of feedback line to point 26. R39 in the feedback lead serves as a de-coupling network in conjunction with C30 which acts as a bypass capacitor for A.C. signals.

The operation of the circuit of FIG. 2 is as follows: Closure of switch S22 connects battery 29 to the power supply terminal 30, thereby energizing the system. Oscillator Q21 impresses an RF signal via diodes D22 and D23 on the ratio detector load resistors R27 and R28 which deliver a signal to the amplifier Q22–Q23–Q24, said signal being a function of the deviation of the frequency of oscillator Q21 from the center frequency of ratio detector transformer T21. The output of the amplifier goes back via the feedback lead to point 26 to complete the feedback loop and to maintain the frequency of Q21 at fixed zero input frequency.

After adjusting the meter V to zero by potentiometer R38, the input voltage under test is connected to terminal 21 with switch S21 in the desired range. The consequent deviation from the zero input across diode D21 caused by the small test current through R23 or R24 results in a re-balancing of the loop with a consequent meter reading on V which accurately reflects the input voltage attenuated by the appropriate scale factor.

The circuitry described herein is also useful for performing the function of a D.C. amplifier. This can be accomplished in FIG. 1, for example, by providing terminal A connected directly to resistor R7 and omitting the remainder of the circuitry between that point and terminal 11. Terminal B connected to ground will serve as the other input terminal. The output connections for the amplifier circuit will be provided by terminal X connected to the feedback loop between the collector electrode of transistor Q3 and the anode of diode D1, and by terminal Y connected to ground. The remainder of the circuitry to the right of terminals X and Y in FIG. 1 would be omitted when the principal circuit between terminals A–B and X–Y is utilized as a D.C. amplifier.

In this amplifier circuit, the reverse biased diode D1 serves as a multifunctioning element which is affected by both the input voltage and the output voltage. The high input resistance of the diode is now a critical factor with respect to gain and serves as an impedance transducer. Instead of the voltage varying across the diode, the total voltage across said diode must remain constant to within 1% despite voltage variations at the input and output.

Assuming that an input signal source that has a D.C. resistance to ground is applied to terminal A, it is evident that the input resistance of the circuit is substantially equal to the resistance of the reverse biased diode D1 which, in one embodiment, may be assumed to be $10^{11}$ ohms. It is also assumed that terminals X and Y are connected to a 1,000 ohm load, thereby establishing an output characteristic of 1,000 ohms. Since the power gain of the circuit resolves itself ultimately upon the ratio between the input resistance and the output resistance, it appears that, under these postulated conditions, the circuit would produce a power gain in the order of 80 db or 100 million. Comparable D.C. amplification is achievable by the circuits herein, depending upon the ratio of the predetermined resistance characteristics of the particular reverse biased diode D1 selected for use, and the particular load with which the amplifier circuit is terminated.

FIG. 2 may also be modified in a manner similar to the modification of FIG. 1 for utilizing the circuitry therein as an amplifier.

In summary, the unique features of the circuits herein were developed around the characteristics of a reverse biased diode. The reverse biased diode exhibits two basic characteristics.

First, it can exhibit a leakage in the order of $10^{-9}$ amperes or less. In some cases as little as $10^{-15}$ amperes can be obtained. One of the interesting features of this leakage is that it does not increase linearly with voltage but exhibits a much higher dynamic impedance until avalanche is reached.

Second, the reverse biased diode exhibits a capacity which is a function of the applied voltage. This capacity decreases with voltage and generally follows a log curve, provided the resistivity of the diode material is constant. Thus, the reverse bias diode is operative as a capacitor which is voltage variable. The capacity may be varied with no D.C. power required outside of the microscopic leakage in the diode. The diode is used in the tuning circuit of a transistor oscillator whereby the oscillator frequency is varied by the D.C. voltage applied to the diode. With a frequency discriminating circuit coupled to the oscillator, the power output of the discriminator is proportional to the voltage applied to the diode.

By means of the present invention there has been achieved a semiconductor amplifying device which is voltage driven and gives a power gain of 80 db or greater. In effect, the novel circuitry herein performs as an impedance transformer with an impedance ratio of greater than one million to one with unity voltage gain.

It is claimed:

1. A high impedance D.C. circuit comprising a voltage control capacitor; means for impressing an external voltage to be measured upon said voltage controlled capacitor; a variable frequency oscillator connected to said voltage controlled capacitor and responsive to tuning by said voltage controlled capacitor; means connected to said oscillator for generating a direct current signal which is a function of the difference between the frequency of said oscillator and a predetermined frequency; a direct current amplifier connected to said generating means for amplifying said direct current signal; feedback circuit means connected between said amplifier and said voltage controlled capacitor to impress the algebraic sum of the external voltage and the output voltage of said amplifier upon said voltage controlled capacitor; an adjustable reference potential circuit; and meter means connected between said amplifier and said adjustable reference potential circuit to measure the difference between said amplifier output voltage and said adjustable reference circuit potential.

2. A circuit according to claim 1 wherein said adjustable reference potential circuit includes an emitter follower transistor.

3. A high impedance D.C. circuit comprising an adjustable input voltage divider; means for applying an external voltage upon said voltage divider; a reverse biased variable capacity diode connected to said voltage divider; a first transistor; an oscillator circuit including said first transistor; first circuit means connected between said diode and said oscillator circuit for varying the frequency of said oscillator circuit in response to the capacity variations of said diode; a frequency discriminator circuit connected to said oscillator circuit for generating a direct current control signal voltage substantially in proportion to the deviations of the frequency of said oscillator circuit away from a predetermined frequency; a second transistor connected to said frequency discriminator circuit for amplifying said direct current control signal voltage; second circuit means connected between said second transistor and said diode for impressing a direct current potential across said diode equal to the sum of the voltage applied to said adjustable input voltage divider and said amplified control signal voltage; an emitter follower transistor connected to said second circuit means; adjustable potentiometer means connected to said emitter follower transistor to set the base voltage of said emitter follower transistor; and meter means connected between said second transistor and said emitter follower transistor for reading the difference of potential between said amplified control signal voltage and the potential of the emitter of said emitter follower.

4. A high impedance D.C. circuit comprising: an adjustable input voltage divider; means for applying an external voltage upon said voltage divider; a reverse biased variable capacity diode connected to said voltage divider; a first transistor; an oscillator circuit including said first transistor; first circuit means connected between said diode and said oscillator circuit for varying the frequency of said oscillator circuit in response to the capacity variations of said diode; a ratio detector circuit connected to said oscillator circuit for generating a direct current control signal which is a function of the deviation of the frequency of said oscillator circuit away from a predetermined frequency; a second transistor connected to said ratio detector circuit for amplifying said direct current control signal voltage; second circuit means connected between said second transistor and said diode for impressing a direct current potential across said diode equal to the sum of the voltage applied to said adjustable input voltage divider and said amplified control signal voltage; an emitter follower transistor connected to said second circuit means; adjustable potentiometer means connected to said emitter follower transistor to set the base voltage of said emitter follower transistor; and meter means connected between said second transistor and said emitter follower transistor for reading the difference of potential between said amplified control signal voltage and the potential of the emitter of said emitter follower.

References Cited by the Examiner

UNITED STATES PATENTS

| 2,819,400 | 1/1958 | Toth | 324—123 |
| 2,936,428 | 5/1960 | Schweitzer | 331—177 |
| 3,007,112 | 10/1961 | Taylor | 324—123 |
| 3,046,479 | 7/1962 | Mead et al. | 324—123 |
| 3,050,693 | 8/1962 | Sinninger | 331—177 |
| 3,087,121 | 4/1963 | Bell | 331—11 |

OTHER REFERENCES

Hammerslag, "Circuit Design Using Silicon Capacitors," Electronics (Sept. 18, 1959), pp. 48–50.

WALTER L. CARLSON, *Primary Examiner.*

FREDERICK M. STRADER, *Examiner.*

D. R. GREENE, J. J. MULROONEY,
*Assistant Examiners.*